UNITED STATES PATENT OFFICE.

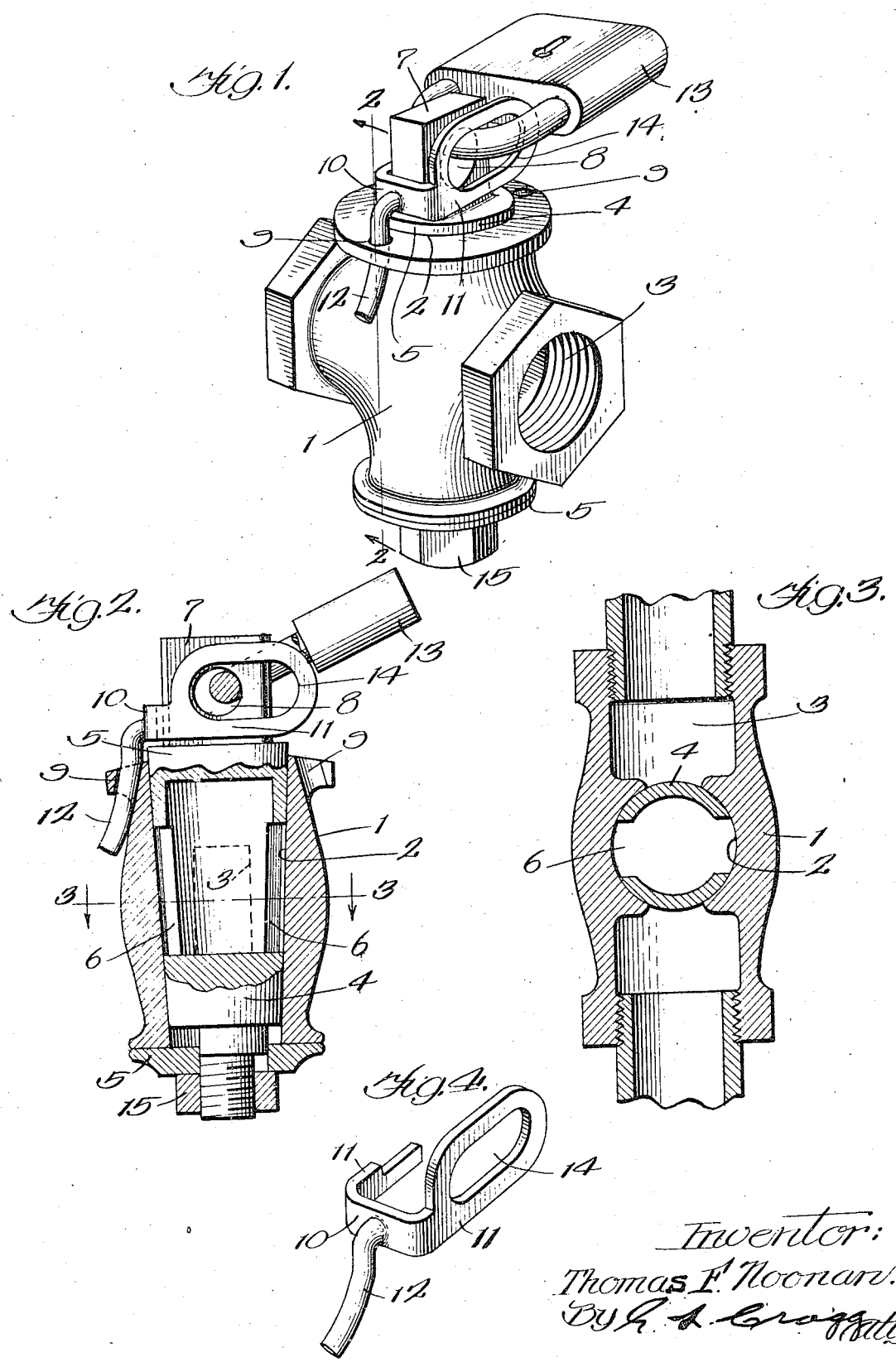

THOMAS F. NOONAN, OF CHICAGO, ILLINOIS.

COMBINED VALVE AND LOCK THEREFOR.

1,322,721.   Specification of Letters Patent.   Patented Nov. 25, 1919.

Application filed July 14, 1919. Serial No. 310,554.

*To all whom it may concern:*

Be it known that I, THOMAS F. NOONAN, citizen of the United States, residing at Chicago, in the county of Cook and State of Illinois, have invented a certain new and useful Improvement in Combined Valves and Locks Therefor, of which the following is a full, clear, concise, and exact description.

My invention relates to valves which are provided with devices for locking them in closed positions and has for its object the improvement and simplification of valve locking structures.

The invention in its full aspects will be set forth in connection with the accompanying drawing showing the preferred embodiment thereof as applied to a valve adapted particularly for permitting or preventing the flow of illuminating gas, though the invention is not to be limited to this use. In the drawings Figure 1 is a perspective view of a valve in combination with my locking device therefor; Fig. 2 is a sectional view on line 2—2 of Fig. 1; Fig. 3 is a sectional view on line 3—3 of Fig. 2; and Fig. 4 is a perspective view of a part of the locking device.

Like parts are indicated by similar characters of reference throughout the different figures.

The valve includes in its formation a casing 1 provided with two bores 2 and 3 extending through the casing substantially at right angles to each other. The casing is formed for the attachment thereto of a pipe at each end of the bore 3 which establishes communication between the pipes that are joined by the valve casing. As illustrated the casing at the ends of this bore 3 are threaded to receive pipe ends that are correspondingly threaded. A valve plug 4 is rotatable in the other bore 2, this plug and casing having engaging formations which prevent the movement of the plug longitudinally of itself and with respect to said casing, but permitting rotation of the plug. These formations upon the valve plug are in the nature of flanges or enlargements 5 between which the casing is disposed and both of which engage the casing that fills the space between these enlargements to prevent endwise movement of the plug. The port 6 extends transversely of the plug therethrough and is brought into or out of communication with the bore 3, according to the position of the plug which may open or close the bore 3 by turning of the valve plug ninety degrees in one direction or the other. The end 7 of the plug that projects from the casing is narrower across the plug and the port 6 in the plug. A circular opening 8 extends through the narrower part of this plug end and transversely of the plug. An opening 9 is formed in a side of the casing along the bore 2 that receives the plug. I provide the locking element which includes a U-shaped part 10 whose sides 11 are sufficiently spaced apart to receive the narrower part of the plug end 7 therebetween. These sides of the U-shaped part are, however, sufficiently close to prevent material turning movement of the plug. A stem 12 projects from the bight of the U-shaped part 10 and angularly to the plane of the U-shaped part, this stem being receivable in the aforesaid opening in the side of the casing. Any suitable form of retaining member 13, such as the hasp of a padlock, is receivable in the opening 8 in the aforesaid plug end, the sides of the U-shaped part 10 being disposable between the retaining member and the casing so that the plug end which is between the sides of the U-shaped part 10 cannot be turned. When the parts are assembled with the stem 12 in the opening 9 and the retaining member 13 in the opening 8 and above the U-shaped part 10, the valve will be held and locked in a closed position thereby constituting an effective cutoff device for disconnecting the gas service pipes in houses from the mains in the streets.

One side of the U-shaped part 10 is widened lengthwise of the valve plug and has an opening 14 therein for registry with the opening 8 in the plug 7. This opening 14 is entirely surrounded by the material of the U-shaped part through which it is formed. The retaining member 13 is passed through both openings 8 and 14. By widening one branch of the U-shaped locking element it will be impossible for any one to open the cock without leaving some trace since the part of the locking element above the opening 14 cannot be deflected nor can the portion below the opening 14 be deflected although this part could be deflected were it not for the balance of the metal surrounding the opening 14. I do not wish to be limited in all embodiments of the invention to the formation of the locking element of U-shape.

In the preferred embodiment of the invention the stem 12 diverges from its base to have its lower or free end further removed from the axis than at its base portion. It will be noted that the opening 9 in the side of the casing is surrounded by the material of the casing. The divergence of the stem 12 and the substantially complete surrounding of the stem by the metal of the casing at the opening 8 would prevent the withdrawal of the valve plug after the nut 15 is loosened. It has hitherto been possible to withdraw these valves by loosening these nuts, a defect which is overcome by the structure of my invention.

I claim:

1. A valve including in its formation a casing provided with two communicating bores extending therethrough substantially at right angles to each other and formed for the attachment thereto of a pipe at each end of one of said bores; and a plug rotatable in the other bore, said plug and casing having engaging formations preventing movement of the plug longitudinally of itself with respect to said casing, the plug having a port extending transversely thereof and therethrough to be brought into and out of communication with the bore at whose ends pipes are to be joined with the casing, said plug having one end projecting from the casing and narrower across the plug and the port in the plug, there being a transverse opening through the narrower part of this plug end and an opening in a side of the casing along the bore that receives the plug; in combination with a locking element including a U-shaped part whose sides are sufficiently spaced apart to receive the narrow part of the plug end therebetween but sufficiently close to prevent material turning movement of the plug, a stem projecting from the bight of said U-shaped part and angularly to the plane of the U-shaped part; and a retaining member receivable in the opening in the aforesaid plug end with the U-shaped part between it and the valve structure, one side of the U-shaped part being widened lengthwise of the valve plug and having an opening therein surrounded by the material thereof and extending transversely therethrough, the retaining member also passing through this opening.

2. A valve including in its formation a casing provided with two communicating bores extending therethrough substantially at right angles to each other and formed for the attachment thereto of a pipe at each end of one of said bores; and a plug rotatable in the other bore, said plug and casing having engaging formations preventing movement of the plug longitudinally of itself with respect to said casing, the plug having a port extending transversely thereof and therethrough to be brought into and out of communication with the bore at whose ends pipes are to be joined with the casing, said plug having one end projecting from the casing and narrower across the plug and the port in the plug, there being a transverse opening through the narrower part of this plug end and an opening in a side of the casing along the bore that receives the plug; in combination with a locking element having a stem projecting therefrom lengthwise of the valve plug, this stem being receivable in the aforesaid opening in the side of the casing, said locking element having a portion extending across the valve and widened lengthwise of the valve plug and having an opening therein; and a retaining member receivable in the opening in the aforesaid plug end and passing through the opening in the aforesaid widened part of the locking element.

3. A valve including in its formation a casing provided with two communicating bores extending therethrough substantially at right angles to each other and formed for the attachment thereto of a pipe at each end of one of said bores; and a plug rotatable in the other bore, said plug and casing having engaging formations preventing movement of the plug longitudinally of itself with respect to said casing, the plug having a port extending transversely thereof and therethrough to be brought into and out of communication with the bore at whose ends pipes are to be joined with the casing, said plug having one end projecting from the casing and narrower across the plug and the port in the plug, there being a transverse opening through the narrower part of this plug end and an opening in the side of the casing along the bore that receives the plug; in combination with a locking element having a stem passing through the last aforesaid opening and diverging from the base of the stem and away from the plug; and a retaining member receivable in the opening in the aforesaid plug end, said locking element having a part interposed between the retaining member and the valve structure.

4. A valve including in its formation a casing provided with two communicating bores extending therethrough substantially at right angles to each other and formed for the attachment thereto of a pipe at each end of one of said bores; and a plug rotatable in the other bore, said plug and casing having engaging formations preventing movement of the plug longitudinally of itself with respect to said casing, the plug having a port extending transversely thereof and therethrough to be brought into and out of communication with the bore at whose ends pipes are to be joined with the casing, said plug having one end projecting from the casing and narrower across the plug and the port in the plug, there being a transverse opening through the narrower part of this plug end and an opening in a side of the casing along the bore that receives the plug; in combination with a locking element including a U-shaped part whose sides are sufficiently spaced apart to receive the narrow part of the plug end therebetween but sufficiently close to prevent material turning movement of the plug, a stem projecting from the bight of said U-shaped part and angularly to the plane of the U-shaped part; and a retaining member receivable in the opening in the aforesaid plug end with the U-shaped part between it and the valve structure.

In witness whereof, I hereunto subscribe my name this 19th day of June, A. D. 1919.

THOMAS F. NOONAN.